United States Patent [19]

Norton

[11] Patent Number: 4,543,789

[45] Date of Patent: Oct. 1, 1985

[54] MULTIPLE DISPLACEMENT HYDRAULIC PUMP SYSTEM WITH AUTOMATIC DISPLACEMENT CONTROL FOR BRAKE BOOSTERS AND THE LIKE

[76] Inventor: Peter Norton, 15612 Hilton, Southfield, Mich. 48075

[21] Appl. No.: 692,846

[22] Filed: Jan. 18, 1985

Related U.S. Application Data

[63] Continuation of Ser. No. 454,463, Dec. 29, 1982, abandoned.

[51] Int. Cl.⁴ .......................... F16D 31/02; F04B 49/08
[52] U.S. Cl. ........................................ 60/545; 417/287; 417/417; 417/302; 303/10
[58] Field of Search .............. 417/286, 287, 302, 416, 417/417; 303/10; 60/545

[56] References Cited

U.S. PATENT DOCUMENTS

| | | | |
|---|---|---|---|
| 2,461,501 | 2/1949 | Miller | 417/417 |
| 2,688,231 | 9/1954 | Northcutt | 417/287 |
| 3,542,495 | 11/1970 | Barthalon | 417/416 |
| 3,887,238 | 6/1975 | Bennett | 303/10 X |
| 3,918,847 | 11/1975 | Junck et al. | 417/428 X |
| 4,019,103 | 4/1977 | Davis et al. | 310/24 X |
| 4,122,378 | 10/1978 | Brown | 417/417 X |
| 4,357,798 | 11/1982 | Hung | 417/302 X |

FOREIGN PATENT DOCUMENTS 656076  12/1928  France .................. 417/287

Primary Examiner—Richard E. Gluck
Attorney, Agent, or Firm—Reising, Ethington, Barnard, Perry & Milton

[57] ABSTRACT

A pump system is disclosed for delivering hydraulic fluid to a load device, such as a hydraulic brake system. The system automatically switches from larger displacement to smaller displacement as pressure at the outlet increases. The pump system comprises one or more lower pressure pumps and a high pressure pump with an actuator driving all pumps simultaneously. An unloading valve is coupled with each lower pressure pump for dumping the output thereof in response to pressure of the fluid delivered to the load device. The actuator comprises an electromagnetic linear motor which imparts an intake stroke to the pumps and stresses a spring which releases stored energy for imparting the pressure stroke to the pumps.

8 Claims, 10 Drawing Figures

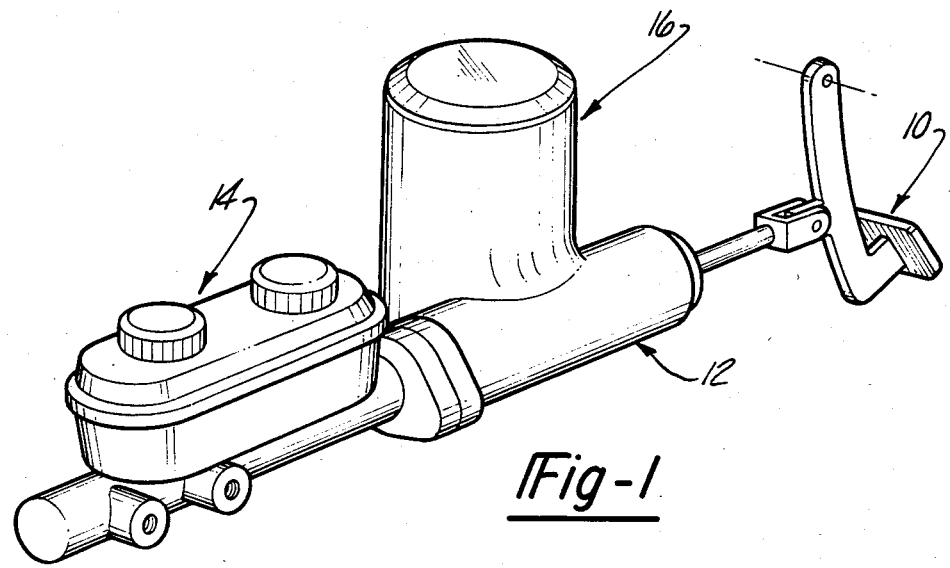
Fig-1
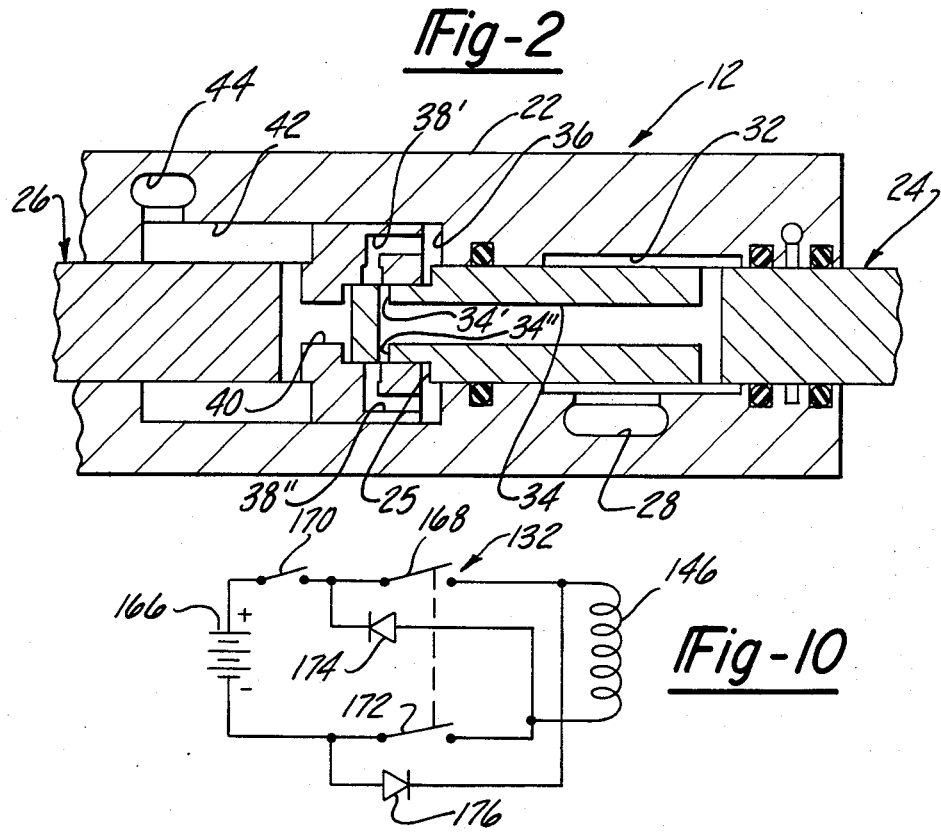
Fig-2
Fig-10

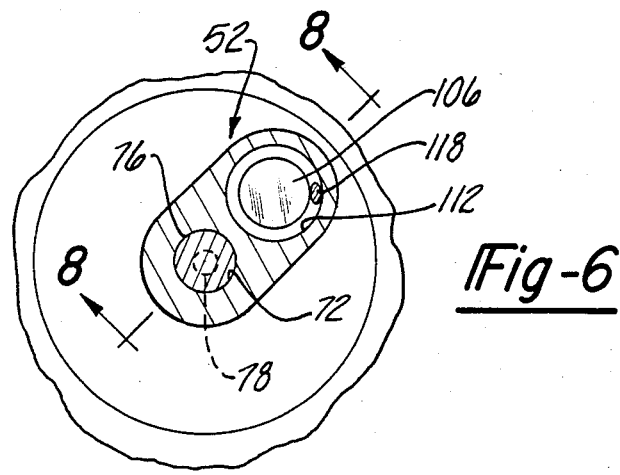
_Fig-6_
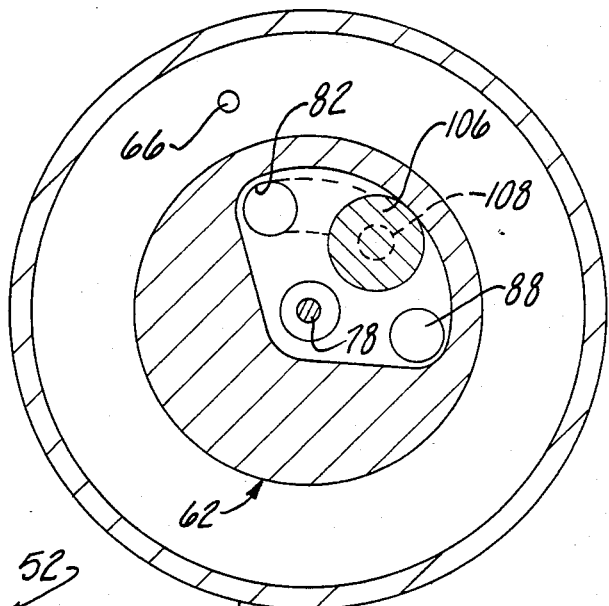
_Fig-7_
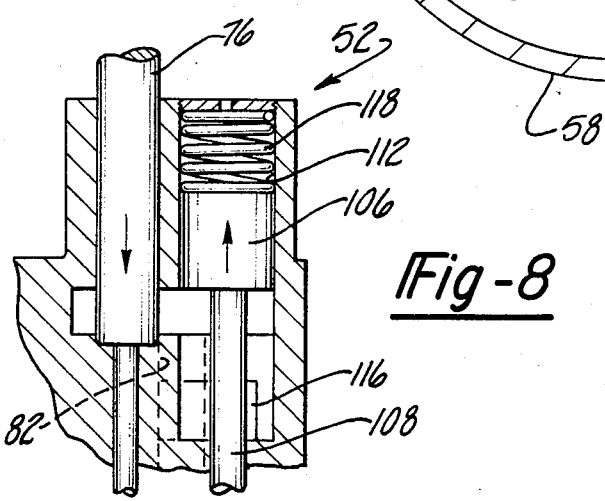
_Fig-8_

MULTIPLE DISPLACEMENT HYDRAULIC PUMP SYSTEM WITH AUTOMATIC DISPLACEMENT CONTROL FOR BRAKE BOOSTERS AND THE LIKE

This is a continuation, of application Ser. No. 454,463 filed on Dec. 29, 1982, now abandoned.

FIELD OF THE INVENTION

This invention relates to hydraulic pumps and more particularly it relates to pump systems capable of both high volume, low pressure operation and low volume, and high pressure operation. It is especially useful as a booster pump system for the hydraulic brakes of a vehicle.

BACKGROUND OF THE INVENTION

There are certain hydraulic systems which require high volume flow at low pressure as well as low volume flow at high pressure. Such a requirement occurs, for example, in a system in which a piston moves freely until it encounters a load or reaction member which imposes a relatively high resistance to further motion of the piston. In such an arrangement, it is desired to have a pump system which delivers high volume flow at low pressure to provide for free travel of the piston over a relatively large range and then delivers low volume flow at high pressure for piston displacement over a small range of travel. This would allow high speed motion during the free travel and the exertion of a relatively large force over a small range of travel and at a standstill.

Hydraulic brakes on automotive vehicles are commonly provided with a power booster to assist the driver in the application of the brakes. Hydraulic brake systems with a power booster, known as "power brakes", conventionally include a servo motor called a "booster" or augmenting the force applied by the driver to the piston of the master cylinder. It has been a common practice to utilize a vacuum powered booster on vehicles having spark ignited engines because of the availability of intake manifold vacuum for energizing the booster. However, on many present day vehicles it is desired to use a hydraulic booster with an electrically energized hydraulic pump. Such is the case with diesel engine vehicles which have no convenient vacuum source. It is also desired to have an electrically powered booster for other reasons such as having booster power with the engine off.

In a hydraulic brake system the flow requirement during the initial brake pedal travel is different from that during the final pedal travel. The system requires a high volume, low pressure flow during the free travel of the movable brake members and then when the brake members, e.g. brake pad and disc are engaged, the system requires high pressure, low volume flow to exert the braking effort.

In the prior art, it is known to use a motor driven, hydraulic booster pump with the motor being energized from the vehicle battery. In this arrangement, the pump is a rotary vane or piston pump and hydraulic fluid under pressure from the pump is stored in an accumulator. The pump is turned on and off in response to accumulator pressure in order to meet the flow requirements of the brake system. This is disadvantageous in that it requires a pressure sensing switch and an accumulator and furthermore the motor is turned on at times not necessarily coincident with the application of the brakes resulting in an on/off cycle which is distracting to the driver. It is also known in the prior art to maintain a continuous flow of fluid from the pump, which is energized from the vehicle engine or an electric motor, and to impose restriction on the flow to obtain the pressure required to actuate the booster.

A general object of this invention is to provide an improved hydraulic pump system capable of high volume, low pressure and low volume, high pressure operation, and which overcomes certain disadvantages of the prior art.

SUMMARY OF THE INVENTION

In accordance with this invention, a pump system is provided for delivering hydraulic fluid to a load device at low pressure, high volume and at high pressure, low volume. This is accomplished by a low pressure pump and a high pressure pump with an actuator driving both pumps simultaneously and an unloading valve coupled with the low pressure pump for dumping the output thereof in response to the pressure of the fluid delivered to the load device. The actuator comprises a resilient member, such as a coil spring, which releases stored energy for driving the pumps and a motor for stressing the resilient member to store energy. This eliminates the need for a pressure sensing switch since the pump stops when the outlet pressure reaches a level such that the spring cannot increase it. Preferably, the pumps are piston pumps and the low pressure pump has a larger bore and the actuator imparts the same stroke to both pumps. The motor is an electromagnetic linear motor, preferably of the voice coil type. The unloading valve comprises a valve element responsive to fluid pressure in a common discharge passage connected with the outlet of the low pressure pump.

Further, the invention provides a booster pump system especially adapted for use with the hydraulic brake system of a vehicle. This is accomplished by a pair of piston pumps having different bores with coaxial pistons coupled for movement in unison by a common actuator. The pumps have a common outlet, and an unloading valve discharges the larger bore pump in response to pressure in the outlet. The actuator comprises a resilient member for imparting the pressure stroke to the pistons and an electromagnetic linear motor for imparting the intake stroke to the pistons and stressing the resilient member. A regenerative braking circuit is connected across the motor winding for limiting the velocity of the pistons on the pressure stroke and for returning the energy thereby obtained to the power source.

A more complete understanding of this invention may be obtained from the detailed description that follows, taken with the accompanying drawings.

DESCRIPTION OF THE DRAWINGS

FIG. 1 is a pictorial view showing the pump system of this invention as it is embodied in a hydraulic brake system of a motor vehicle;

FIG. 2 shows a hydraulic booster;

FIG. 6 is a view taken on lines 6—6 of FIG. 3;
FIG. 7 is a view taken on lines 7—7 of FIG. 3;
FIG. 8 is a view taken on lines 8—8 of FIG. 6;

FIG. 10 is a schematic diagram of the electrical circuit for the pump system.

BEST MODE FOR CARRYING OUT THE INVENTION

Figure 3:
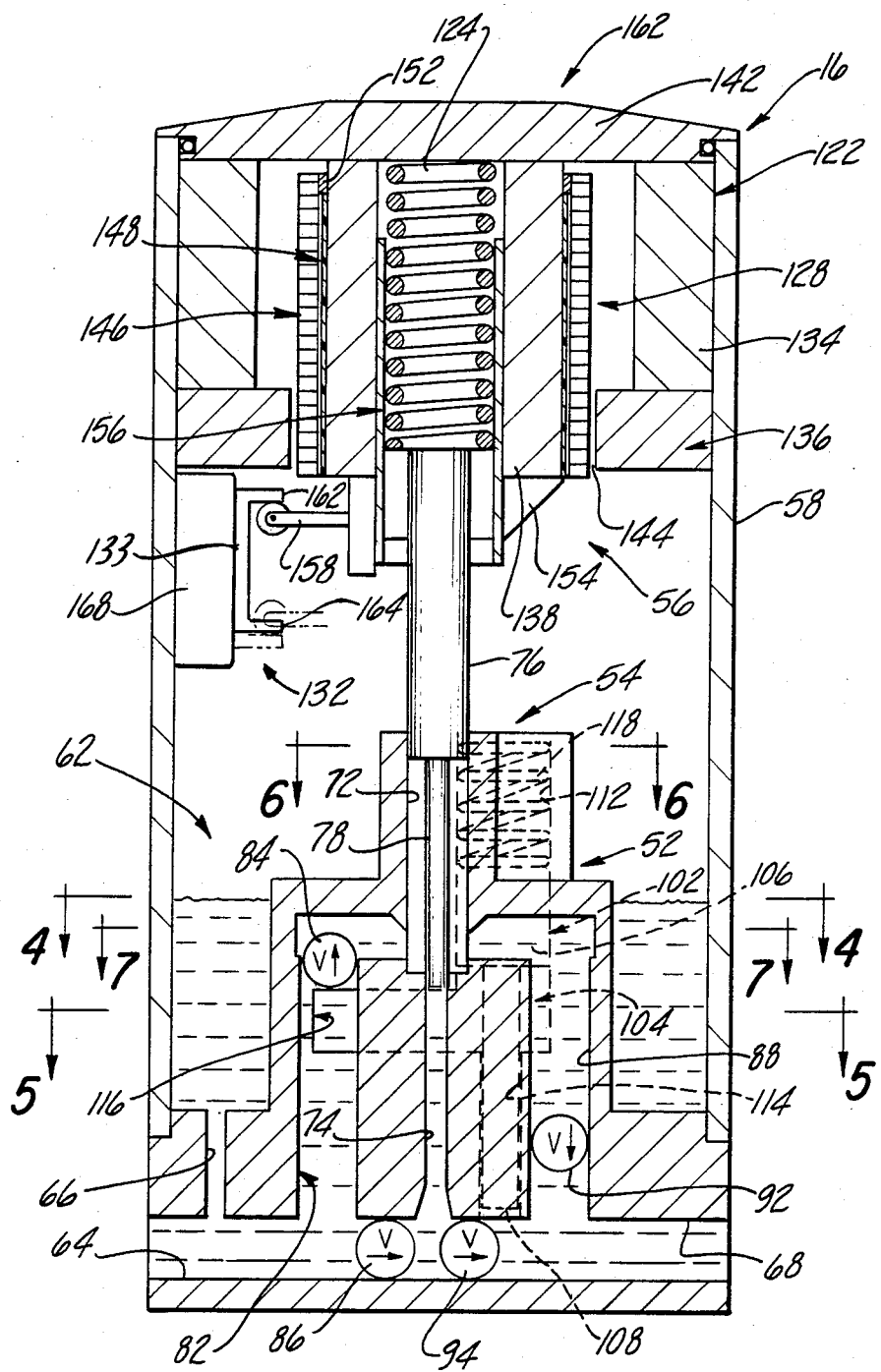
FIG. 3 is a diagrammatic view showing the pump system of this invention.

Referring now to the drawings, there is shown an illustrative embodiment of the invention in a hydraulic booster pump system for use in a brake system of a motor vehicle. It will be appreciated, as the description proceeds, that the invention is useful in other hydraulic systems which require both low pressure, high volume and high pressure, low volume flow.

A vehicle hydraulic brake system which incorporates the subject invention is represented in pictorial view in FIG. 1. This system comprises a brake pedal 10 which is manually actuated to operate a hydraulic booster 12, which in turn energizes the master cylinder 14. A booster pump system 16, constructed in accordance with this invention, supplies pressurized hydraulic fluid to the booster 12.

The hydraulic booster 12 is depicted further in FIG. 2 and will be described briefly prior to the description of the booster pump system 16. In general, the booster comprises a body or cylinder 22, a control element 24 and an output piston 26. The control element 24 is connected with the brake pedal 10 through suitable linkage and is actuated thereby. The output piston 26 is operatively connected with the master cylinder 14 which pressurizes the brake fluid in the brake lines to the wheel cylinders to exert braking effort in accordance with the manual effort applied to the brake pedal. Pressurized fluid from the pump system 16 is supplied to the booster through an inlet passage 28 which communicates with annular chamber 32. Fluid from the chamber 32 is supplied through a passage 34 in the control element 24 to a pressure chamber 36 in the manner to be described below. At other times, the pressure chamber 36 may be connected through passages 38' and 38'' and through a passage 40 to a chamber 42 and then to a sump or low pressure reservoir through an outlet passage 44.

When the brake pedal 10 is in its free or retracted position, the control element 24 is retracted so that fluid is blocked from flowing through passages 34' and 34'' into passages 38' and 38''. When the brake pedal 10 is depressed, the control element 24 moves to the left relative to the output piston 26 causing passages 34' and 34'' to move toward alignment with passages 38' and 38''. Leftward movement of control element 24 relative to the output piston 26, tends to close the communication through passages 38' and 38'' of the pressure chamber 36 with the passage 40 and the reservoir and allows a build-up of pressure in chamber 36. Further travel of the control element 24 relative to the output piston 26 causes passages 34' and 34'' to communicate with passages 38' and 38'' and causes the pressure chamber 36 to be pressurized. The pressure in chamber 36 acts on the output piston 26 which exerts a force on the piston of the master cylinder to apply the brakes. The pressure in chamber 36 also acts on the face 25 of control element 24 with a force proportional to the pressure in chamber 36 which is imparted through the brake pedal 10 to give the driver an indication of the braking force. Increased force on the brake pedal causes further leftward movement of the control element 24 and additional pressurized fluid is admitted to the pressure chamber 36 causing further movement of the output piston 26 such that it tends to follow the movement of the control element 24. When the brake pedal is released, a spring (not shown) in combination with the pressure in the pressure chamber 36 acting on face 25 of the control element 24 urges it to the right so that the brake pedal assumes its free position. The pressure in chamber 36 is relieved through passages 38' and 38'' which communicate through passage 40 with the outlet chamber 42 and the outlet passage 44 to the reservoir. The output piston 26 is restored to its home position by the master cylinder. The booster is failsafe in that the control element 24 is adapted to mechanically engage the output piston 26 which is then actuated by the motivating force from the brake pedal, in the event that fluid pressure fails to move the output piston 26.

Figure 4:
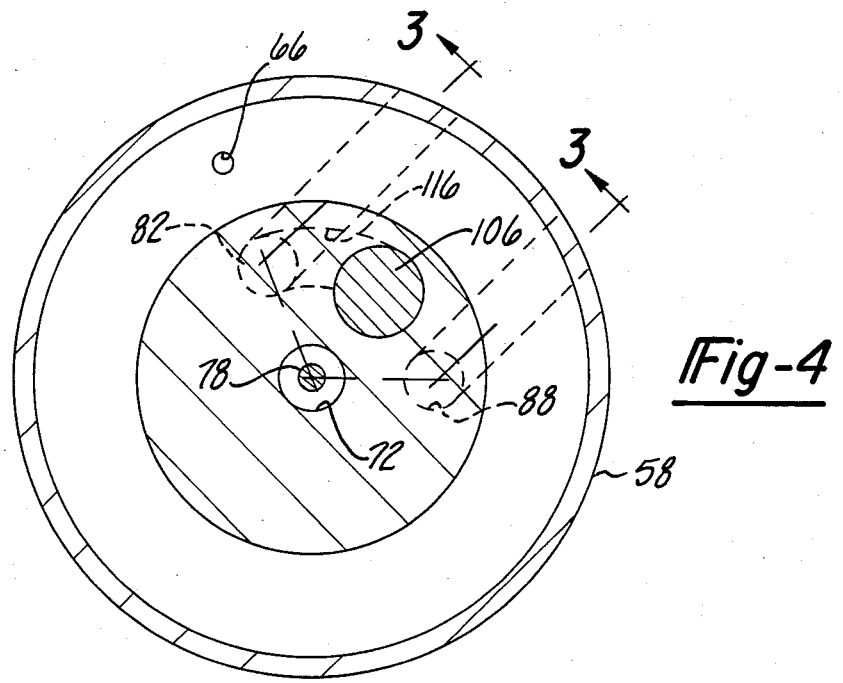
FIG. 4 is a view taken on lines 4—4 of FIG. 3.
Figure 5:
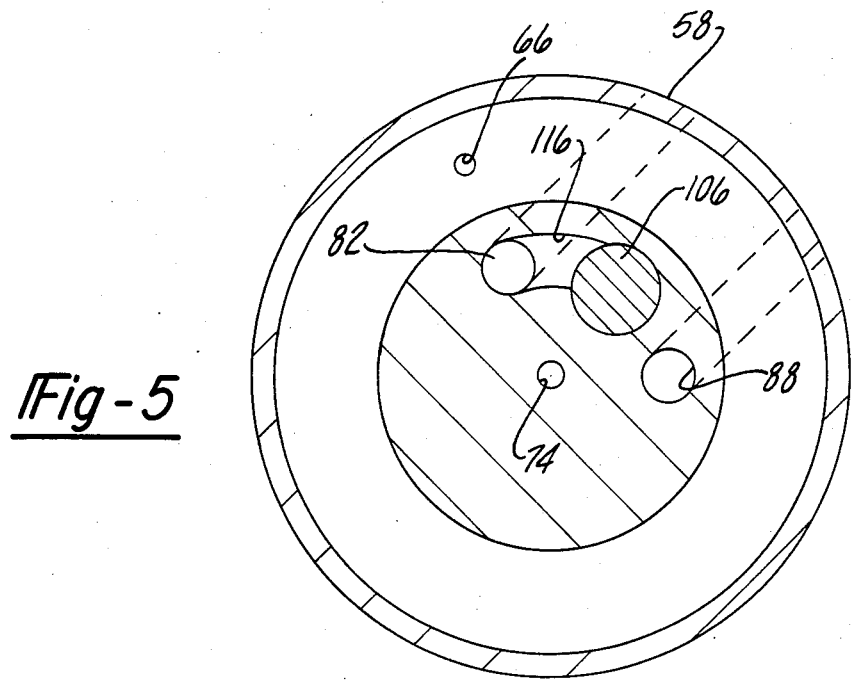
FIG. 5 is a view taken on lines 5—5 of FIG. 3.
Figure 9:
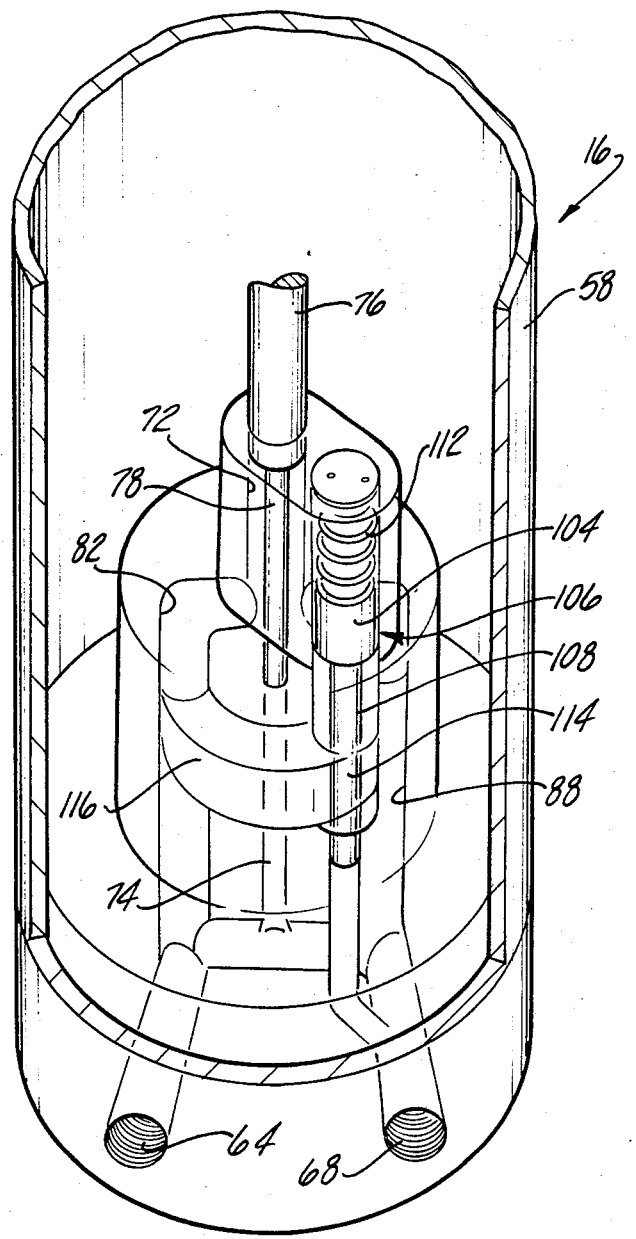
FIG. 9 is a perspective cutaway view of part of the pump system.

The booster pump system 16 of this invention is depicted in FIGS. 3 through 9. The booster pump system, in general, comprises a pump body 52, a piston assembly 54, a pump actuator 56 and a casing 58. As indicated in FIG. 1, the booster pump system 16 and the hydraulic booster 12 may be supported in a common housing and they may be constructed with unitary bodies rather than be separate parts.

The pump body 52 and the casing 58 form a fluid reservoir 62 for supply of hydraulic fluid to the pump system and the hydraulic booster. The pump body 52 is provided with an inlet passage 64 which is supplied with fluid from the reservoir through a passage 66. The inlet passage 64 is connected with outlet passage 44 of the hydraulic booster 12 by means not shown. The pump body also includes a discharge passage 68 which is connected with the inlet passage 28 of the hydraulic booster 12 by means not shown. The pump body is provided with a low pressure cylinder 72 and a coaxial high pressure cylinder 74 of a smaller bore. The piston assembly 54 includes a piston 76 and unitary coaxial piston 78. The piston 76 and the cylinder 72 form a low pressure pump and the piston 78 and cylinder 74 form a high pressure pump. In the pump body 52, the lower end of the cylinder 72 is connected with the inlet passage 64 through a passage 82 and a check valve 84. Similarly, the lower end of the cylinder 74 is connected with the inlet passage 64 through a check valve 86. The check valves 84 and 86 allow fluid flow into the respective cylinders during the intake stroke of the pistons. The lower end of the low pressure cylinder 72 is connected with the common discharge passage 68 through an outlet passage 88 and a check valve 92. Similarly, the lower end of the high pressure cylinder 74 is connected with the common discharge passage 68 through a check valve 94. During the pressure stroke of the pistons 76 and 78, the check valves 92 and 94 allow fluid flow from the respective cylinders to the discharge passage 68 while the check valves 84 and 86 prevent back flow to the inlet passage 64.

The pump body 52 includes an unloading valve 102 which is adapted to connect the outlet passage 88 of the low pressure pump with the inlet passage thereof in response to fluid pressure in the discharge passage 68. The unloading valve 102 comprises the valve element in the form of a piston 104 having a head 106 and a stem 108. The piston head 106 is disposed in a cylinder 112 while the stem 108 is disposed within a cylinder 114. The cylinder 112 intercepts an arcuate passage 116 which extends to the inlet passage 82. The piston 104 is biased downwardly by a coil spring 118 and in the downward position the piston head 106 obstructs fluid flow from the outlet passage 88 through the passage 116 to the inlet passage 82. The piston 104 is urged upwardly by the fluid pressure in the discharge passage 68 acting on the lower end of the piston stem 108. The pressures on the upper and lower surfaces of the piston head 106 are always at the low pressure of the reservoir. Thus, when the fluid pressure in the discharge passage 68 is increased to a predetermined value, the opening force on the piston stem 108 produced by the fluid pressure overcomes the opposing force of the spring 118 and the unloading valve is opened. This by-passes or dumps the fluid from the outlet passage 88 of the low pressure pump to the inlet passage 82 so that the low pressure pump is disabled and idles while the high pressure pump continues to operate. The check valve 92 prevents flow from the discharge passage 68 through the passages 88 and 82 to the inlet passage 64 when the unloading valve is open.

The actuator 56 for the pistons 76 and 78 comprises, in general, an electromagnetic linear motor 122 and a resilient energy storage member in the form of a coil spring 124. The motor 122 comprises a permanent magnet stator 162, moving coil armature 128 and a switch 132. The magnetic circuit of the stator 162 comprises an annular permanent magnet 134, and an outer pole piece 136 seated on the magnet, and an inner annular pole piece 138 seated on a circular end plate 142 which, in turn is seated on the magnet 134. An annular air gap 144 is provided between the circular pole faces of the pole pieces 136 and 138. The armature 128 includes a conductive coil 146 which is wound on an insulating coil form 148. A bearing element 152 on the coil form bears against the outer surface of the inner pole piece 138 to permit axial movement of the coil 146. The coil form 148 is mounted on a support member 154 which is connected with the upper end of the piston 76. A tube 156 is mounted on the support member 154 and is slidably disposed inside the pole piece 138 to maintain alignment of the armature assembly. The switch 132 is mounted on the case 58 and is suitably a slide switch with double-pole, single-throw contacts which are operated by a slide 133. An actuating arm 158 is mounted on the support member 154 for movement with the armature. The actuating arm 158 engages a shoulder 162 on the slide 133 at the end of the intake stroke and it engages a shoulder 164 at the end of the pressure stroke.

The electrical circuit for the motor is illustrated in FIG. 10. The coil 146 is energized from a battery 166, suitably the vehicle battery, through an on/off switch 170 and the switch 132. The switch 132 has a movable contact 168 between the positive terminal of the battery and one terminal of the coil 146 and a movable contact 172 between the negative terminal of the battery and the other terminal of the coil. When the armature is at the end of a pressure stroke, the contacts of switch 132 are closed and the coil 146 is energized. This causes the armature to be retracted against the resistance of the coil spring 124 to store energy in the coil spring. When the armature reaches the end of its intake stroke the contacts of switch 132 are opened and the coil is deenergized. The pistons 76 and 78 are actuated on the pressure stroke by the stored energy of the spring 124 until the armature reaches the end of its pressure stroke. At that point, the switch 132 is closed and the winding 146 is energized to retract the armature and store energy in the spring for the next pressure stroke. In some operating conditions, the pump will be operating with a low output pressure and it is desirable to limit the speed of the armature travel. This is provided by a regenerative braking circuit for the armature which not only limits the armature speed but also supplies energy to the battery. For this purpose, a diode 174 is connected with reverse polarity between the positive terminal of the battery and the negative terminal of the coil 146. Similarly, a diode 176 is connected with reverse polarity between the negative terminal of the battery and the positive terminal of the coil 146. In this arrangement, the motion during the pressure stroke of the coil 146 through the magnetic field of the stator generates a voltage in the coil with a polarity such that current flows through diodes 174 and 176 to recharge the battery. Also, the diodes serve to limit the inductive surge voltage across the switch 132 when it is opened.

The pump circuit, as is shown in FIG. 10 is energized through the on/off switch 170 by the battery 166. Switch 170 is preferably actuated by the brake pedal and may be the same switch that energizes the vehicle brake lights. Accordingly, the booster pump system 16 is operative and the motor is energized from the battery when the armature reaches the end of the pressure stroke. This initiates the intake stroke with the armature being retracted to compress the drive spring 124 until the armature reaches the end of its intake stroke at which point the motor is deenergized. The pressure stroke follows under the driving force of the spring 124. The travel of the armature during the pressure stroke depends upon the value of fluid pressure in the hydraulic booster, as will be described below.

With the brake pedal 10 in its free position, the on/off switch 170 is open and no power is supplied to the pump. When the driver depresses the brake pedal, the initial movement thereof causes the on/off switch 170 to close and the pump is energized. The mode of operation of the system will depend upon the rate of displacement of the brake pedal by the driver. Two modes of operation will be described; first, a panic stop produced by rapid depression of the brake pedal and, second, a gradual stop produced by slow depression of the brake pedal.

In the case of a panic stop, the driver forcefully depresses the brake pedal causing it to be moving fast at the time the switch 170 is closed. This will create an immediate demand for a large volume of low pressure fluid and as soon as the switch closes the pump will operate at its maximum rate. At pump start-up, the pressure in the discharge passage 68 is low and the unloading valve 102 is closed. While the unloading valve remains closed, both the low pressure pump and the high pressure pump deliver fluid to the discharge passage 68 on the pressure stroke. The entire output of the discharge passage enters the inlet passage 28 of the booster 12 and flows through the annular chamber 32 to passage 34 and thence through the passages 34' and 34" to passages 38' and 38" to the pressure chamber 36. A pressure build-up in the chamber 36 applies pressure to the piston 26 to assist the driver in applying the brakes. It is possible in this mode of operation that the failsafe character of the booster 12 will come into effect and the driver will force the output piston to move ahead of the fluid supply to the pressure chamber 36 thus tending to draw fluid into the chamber.

When the vehicle braking system becomes pressurized, the flow rate of the pressurized fluid will drop. The pressure at the discharge passage 68 of the pump will increase and the unloading valve 102 will open. This will cause the low pressure pump to idle, i.e. the outlet passage 88 will be connected with the inlet passage 82. In this condition, only the high pressure pump will deliver pressurized fluid to the discharge passage 68 and the output thereof will be diminished to a fraction of the previous flow. A diminished flow may be inadequate to meet the demand and the pressure in the discharge passage 68 may fall off and the unloading valve 102 may reclose. Several cycles of opening and closing of the unloading valve may occur before the demand for fluid drops to a point that can be met by the high pressure pump. This effect can be minimized if desired, by inclusion of a third, intermediate displacement pump and a second unloading valve. Finally, the demand for fluid will drop to a minimal value because the driver is satisfied with the braking force and does not increase the force supplied to the brake pedal or because he is demanding and obtaining the maximum boost from the system. If the driver demands the maximum boost by forcing the control valve 24 as far leftward as possible, the pressure chamber 36 is pressurized to the full output pressure of which the high pressure pump is capable. If the driver is not demanding so much braking force, an equilibrium point will be reached in which the passages 34' and 34" are not fully opened into passages 38' and 38". In either case, the demand for fluid from the booster pump drops to a minimal value resulting primarily from leakage past the valve arrangement between the left end of control element 24 and piston 26 at the outer ends of passages 34' and 34". In this condition, the piston of the high pressure pump moves slowly on its pressure stroke to satisfy the leakage demand until it reaches the end of its travel at which point the switch contracts 168 and 172 are closed to initiate the intake stroke and the next cycle will occur.

In the case of gradual brake application by the driver, the on/off switch 170 is closed during the initial movement of the brake pedal and the pump actuator is energized. Except for fluid leakage, there is no immediate demand for fluid flow because the passages 34' and 34" are obstructed. Thus, the pressure at the discharge passage 68 of the booster increases and the unloading valve 102 is opened. With the unloading valve opened, the low pressure pump idles and the high pressure pump pressurizes the output passage 68 to its maximum value, with occasional cycling of the high pressure pump to replenish the leakage fluid. As the driver further depresses the brake pedal, the passages 34' and 34" move into alignment with the passages 38' and 38" and fluid flows into the pressure chamber 36. The pressure at the outlet passage 68 will remain at the maximum capability of the high pressure pump and there will be a pressure drop between the passages 34' and 34" and passages 38' and 38", respectively, to control the pressure in chamber 36 and cause the output piston 26 to move in synchronism with the control element 24. As the pedal is further depressed and the flow increases up to a certain point, the unloading valve will remain open so the high pressure pump delivers the required flow, but with increased speed of its pressure stroke. If the flow rate exceeds the capacity of the high pressure pump, pressure in the outlet passage 68 will decrease and the unloading valve 102 will close causing the low pressure pump to be operative so that both high pressure and low pressure pumps deliver fluid to the discharge passage 68. When the vehicle braking system becomes pressurized, the demand for fluid will diminish and the unloading valve 102 will open and the pressure at the discharge passage 68 will increase to the maximum pressure of the high pressure pump. The high pressure pump will operate as necessary to compensate for leakage and to assist the driver as he varies the application of the brakes. There is a pressure drop between the passages 34' and 34", which contain the booster pump outlet pressure, and the passages 38' and 38" in which the pressure is that required to cause the output piston 26 to move in synchronism with the control valve 24.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A hydraulic brake system for an automotive vehicle comprising:
   a hydraulic booster,
   a pump system for supplying pressurized fluid to said booster from a reservoir,
   said booster including a pressure chamber, an inlet port and an outlet port and including a booster valve adapted to be actuated by a brake pedal and which is movable from a center position to admit pressurized fluid from the inlet port to the pressure chamber or movable from said center position to release pressurized fluid from said pressure chamber to said outlet port,
   said pump system including,
   an electric motor,
   a low pressure pump and a high pressure pump adapted to be driven concurrently by said motor, said pumps having respective inlets adapted to be coupled with the reservoir and having respective outlets,
   a common discharge passage coupled with the outlet of the high pressure pump and coupled through a one-way valve with the outlet of the low pressure pump and coupled with said inlet port of said hydraulic booster,
   and an unloading means coupled with the outlet of the low pressure pump and being operable to enable fluid pumped by the low pressure pump to flow with minimal resistance to said reservoir when fluid pressure in the common discharge passage exceeds a predetermined value,
   said pumps collectively having sufficient pumping capacity to supply the requirement of said brake system without supplementary flow from any other source.

2. The invention as defined in claim 1 wherein,
   each pump has a piston, the pistons being coupled with each other for movement in unison,
   and said motor comprises an electrically energized actuator coupled with said pistons, said actuator comprising an electromagnetic linear motor for imparting an intake stroke to said pistons, and a resilient member for storing energy and releasing stored energy for displacing said pistons in a pressure stroke.

3. The invention as defined in claim 2 including,
   switch means for energizing said actuator in response to application of the brakes whereby the pumps are operative immediately to supply the required fluid flow for brake application regardless of pressure loss due to leakage during the interval between brake applications.

4. The invention as defined in claim 2 inculding, switch means for energizing said motor at a predetermined position on the pressure stroke and for deenergizing the motor at a second predetermined position on the intake stroke.

5. The invention as defined in claim 2 wherein, said motor includes an armature coil and a stator, and a regenerative braking circuit connected across the armature coil for retarding the motion of the pistons on the pressure stroke and for returning energy to the electrical power source for said motor.

6. The invention as defined in claim 2 including, switch means for energizing said motor at a predetermined position on the pressure stroke and for deenergizing the motor at a second predetermined position on the intake stroke, said switch means comprising a first switch for connecting one terminal of said armature coil to one terminal of said power source, a second switch for connecting the other terminal of the coil to the other terminal of said power source, and a regenerative braking circuit comprising a first diode connected in parallel with the series combination of said first switch and said coil and a second diode connected in parallel with the series combination of said second switch and said coil, whereby said diodes limit the inductive surge voltage across said switches when the switches open and whereby said diodes conduct current to return energy to said power source when the speed of the armature coil on the pressure stroke exceeds a predetermined value.

7. The invention as defined in claim 1 wherein, said unloading means is a valve comprising a valve element, a valve inlet communicating with the outlet of the low pressure pump and a valve outlet communicating with the reservoir, said valve element obstructing fluid flow when the valve is closed, and biasing means urging the valve element toward the closed position, said valve element being urged away from the closed position by fluid pressure in the common discharge passage, whereby the valve is opened at a predetermined value of pressure in the common discharge passage.

8. The invention as defined in claim 7 wherein, said valve element comprises a stem in fluid communication with said common discharge passage and an enlarged head on said stem for obstructing fluid flow between said valve inlet and said valve outlet.

* * * * *